US012785491B2

(12) United States Patent
Uematsu

(10) Patent No.: US 12,785,491 B2
(45) Date of Patent: Nov. 3, 2026

(54) ACTUATOR AND MACHINE

(71) Applicant: FANUC CORPORATION, Yamanashi (JP)

(72) Inventor: Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 173 days.

(21) Appl. No.: 18/684,811

(22) PCT Filed: Aug. 26, 2021

(86) PCT No.: PCT/JP2021/031385
§ 371 (c)(1),
(2) Date: Feb. 19, 2024

(87) PCT Pub. No.: WO2023/026436
PCT Pub. Date: Mar. 2, 2023

(65) Prior Publication Data
US 2024/0380275 A1 Nov. 14, 2024

(51) Int. Cl.
*H02K 5/22* (2006.01)
*H02K 11/20* (2016.01)

(52) U.S. Cl.
CPC ............... *H02K 5/22* (2013.01); *H02K 11/20* (2016.01)

(58) Field of Classification Search
CPC ............. H02K 5/22; H02K 11/20; H02K 9/12
USPC ..................... 310/68 B, 52, 58, 59, 60 R, 64
See application file for complete search history.

(56) References Cited

U.S. PATENT DOCUMENTS

2006/0261690 A1* 11/2006 Petersen ................... H02P 8/12
310/179

FOREIGN PATENT DOCUMENTS

| | | | | |
|---|---|---|---|---|
| CN | 102810943 A | * 12/2012 | ............. H02K 9/197 |
| CN | 103066787 A | 4/2013 | |
| CN | 211940993 U | * 11/2020 | |
| JP | H03134345 A | 6/1991 | |
| JP | H06050283 A | 2/1994 | |
| JP | H08019218 A | 1/1996 | |
| JP | 10174368 A | * 6/1998 | |
| JP | 2012016799 A | 1/2012 | |
| JP | 2018054563 A | 4/2018 | |
| JP | 2018057055 A | 4/2018 | |
| JP | 2018078742 A | 5/2018 | |
| JP | 2019054710 A | 4/2019 | |
| JP | 2020015146 A | 1/2020 | |
| JP | 2020197188 A | 12/2020 | |
| JP | 2020205742 A | 12/2020 | |
| WO | 2019044518 A1 | 3/2019 | |

(Continued)

OTHER PUBLICATIONS

English Abstract and Machine Translation for Japanese Publication No. JP 10174368 A, published Jun. 26, 1998, 13 pgs.

(Continued)

*Primary Examiner* — Jose A Gonzalez Quinones
(74) *Attorney, Agent, or Firm* — Fredrikson & Byron, P.A.

(57) ABSTRACT

This actuator comprises: an electric motor; an accommodation part that accommodates the electric motor; a detection part that detects operation of the electric motor; and a fixing part that, at a position further radially outward than the detection part, fixes to a machine housing an end surface of the accommodation pant which is on the opposite side from the output side of the electric motor.

13 Claims, 6 Drawing Sheets

(56) References Cited

FOREIGN PATENT DOCUMENTS

WO 2020112072 A1 6/2020

OTHER PUBLICATIONS

PCT International Search Report dated Oct. 12, 2021 for related International Application No. PCT/JP2021/031385, from which the instant application is based, English translation, 2 pgs.
English Abstract and Machine Translation for Japanese Publication No. JP 2020-015146 A, published Jan. 30, 2020, 35 pgs.
English Abstract and Machine Translation for Japanese Publication No. JP 2020-197188 A, published Dec. 10, 2020, 43 pgs.
English Abstract and Machine Translation for Japanese Publication No. JP 2018-078742 A, published May 17, 2018, 27 pgs.
English Abstract and Machine Translation for Japanese Publication No. JP 2018-057055 A, published Apr. 5, 2018, 30 6 pgs.
English Abstract and Machine Translation for Japanese Publication No. JP 2019-054710 A, published Apr. 19, 2019, 44 7 pgs.
English Abstract and Machine Translation for Japanese Publication No. JP 2020-205742 A, published Dec. 24, 2020, 30 8 pgs.

* cited by examiner

ACTUATOR AND MACHINE

RELATED APPLICATIONS

This application is a 35 U.S.C. 371 national phase filing from International Application No. PCT/JP2021/031385, filed Aug. 26, 2021, the contents of which are incorporated herein by reference.

FIELD

The present invention relates to an actuator, and more particularly relates to an actuator and a machine of which the heat dissipation is increased.

BACKGROUND

In general, in a motor, heat generated in a winding (copper loss) and heat generated in a core (iron loss) are conducted to a container unit of the motor and subsequently dissipated by emission into the atmosphere or by heat conduction to a housing of a machine, such as a robot. However, when the size of the motor is smaller than the size of the housing of the machine and the motor is arranged in the housing of the machine, emission of heat to the outside air is restricted. On the other hand, when a heat conduction path to the housing of the machine is long or a cross-sectional area of the heat conduction path is small, heat conduction efficiency is poor and heat dissipation of the motor deteriorates. Deterioration in the heat dissipation of the motor leads to a reduction in continuous rated torque. As a background technology related to the present application, the following literature has been known.

PTL 1 describes that in order to discharge heat of a motor to the outside air, a robot arm including a first link and a second link is configured in such a manner that the robot arm includes a support portion that supports the motor inside the first link and a rotation transfer mechanism that transfers rotational force of the motor supported by the support portion to the first link and heat generated in the motor is conducted to the first link by arranging a heat conduction member between the motor and the first link.

PTL 2 describes that, in a valve timing control device of an internal combustion engine, a flange portion of a motor housing and a casing of a control mechanism on the opposite side to the output side of the motor are fixed to a chain case of the engine main body with a bolt. PTL 2 also describes that the casing is formed of aluminum alloy material having a high heat dissipation.

PTL 3 describes that in an electric actuator, a plurality of housing constituent members are formed of aluminum alloy having a high thermal conductivity.

PTL 4 describes that in an electric drive device and an electric power steering device, in order to efficiently dissipate heat in a power supply circuit unit and a power conversion circuit unit to the outside, a power supply circuit side heat dissipation unit and a power conversion circuit side heat dissipation unit that conduct at least heat generated in the power supply circuit unit and the power conversion circuit unit to a motor housing are formed on an end surface portion of the motor housing on the opposite side to the output portion of a rotor shaft of an electric motor and at the same time, the power conversion circuit side heat dissipation unit formed on the end surface portion is formed at a position closer to the electric motor side than a sensor magnet of a rotation detection unit that constitutes the rotation detection unit fixed to an end on the opposite side to the output portion of the rotor shaft.

CITATION LIST

Patent Literature

[PTL 1] Japanese Unexamined Patent Publication (Kokai) No. 2020-15146A

[PTL 2] Japanese Unexamined Patent Publication (Kokai) No. 2020-197188A

[PTL 3] Japanese Unexamined Patent Publication (Kokai) No. 2018-078742A

[PTL 4] Japanese Unexamined Patent Publication (Kokai) No. 2018-057055A

SUMMARY

Technical Problem

In consideration of the conventional problem, an object of the present invention is to provide a technology for increasing heat dissipation of an actuator.

Solution to Problem

One aspect of the present disclosure provides an actuator that includes a motor, a container that contains the motor, a detection unit configured to detect operation of the motor, and a fixing unit that fixes, on an outer side in a radial direction of the detection unit, an end surface of the container on an opposite side to an output side of the motor to a housing of a machine.

Another aspect of the present disclosure provides a machine that includes the aforementioned actuator.

Advantageous Effects of Invention

According to the above aspects of the present disclosure, even when the size in the radial direction of the motor is designed to be smaller than the size in the radial direction of the housing of the machine, since the fixing unit fixes, on the outer side in the radial direction of the detection unit, the end surface of the container unit on the opposite side to the output side of the motor to the housing of the machine, generated heat in the motor can be directly dissipated from the container unit to the housing of the machine. In addition, when the container unit is exposed to the outside air, generated heat in the motor can be directly emitted from the container unit to the outside air. Direct heat conduction to the housing and direct heat emission to the outside air enable heat dissipation of the actuator to be increased and continuous rated torque of the motor to be eventually improved.

DESCRIPTION OF EMBODIMENTS

Embodiments of the present disclosure will be described below in detail with reference to the accompanying drawings. The same or similar constituent elements in the respective drawings are given the same or similar reference signs. In addition, the embodiments described below do not limit the technical scope of the invention described in the claims and meanings of terms. Note that in the description, the term "front" means the output side or the load side of an actuator, and the term "rear" means the opposite side to the output side or the anti-load side of the actuator.

Figure 1:
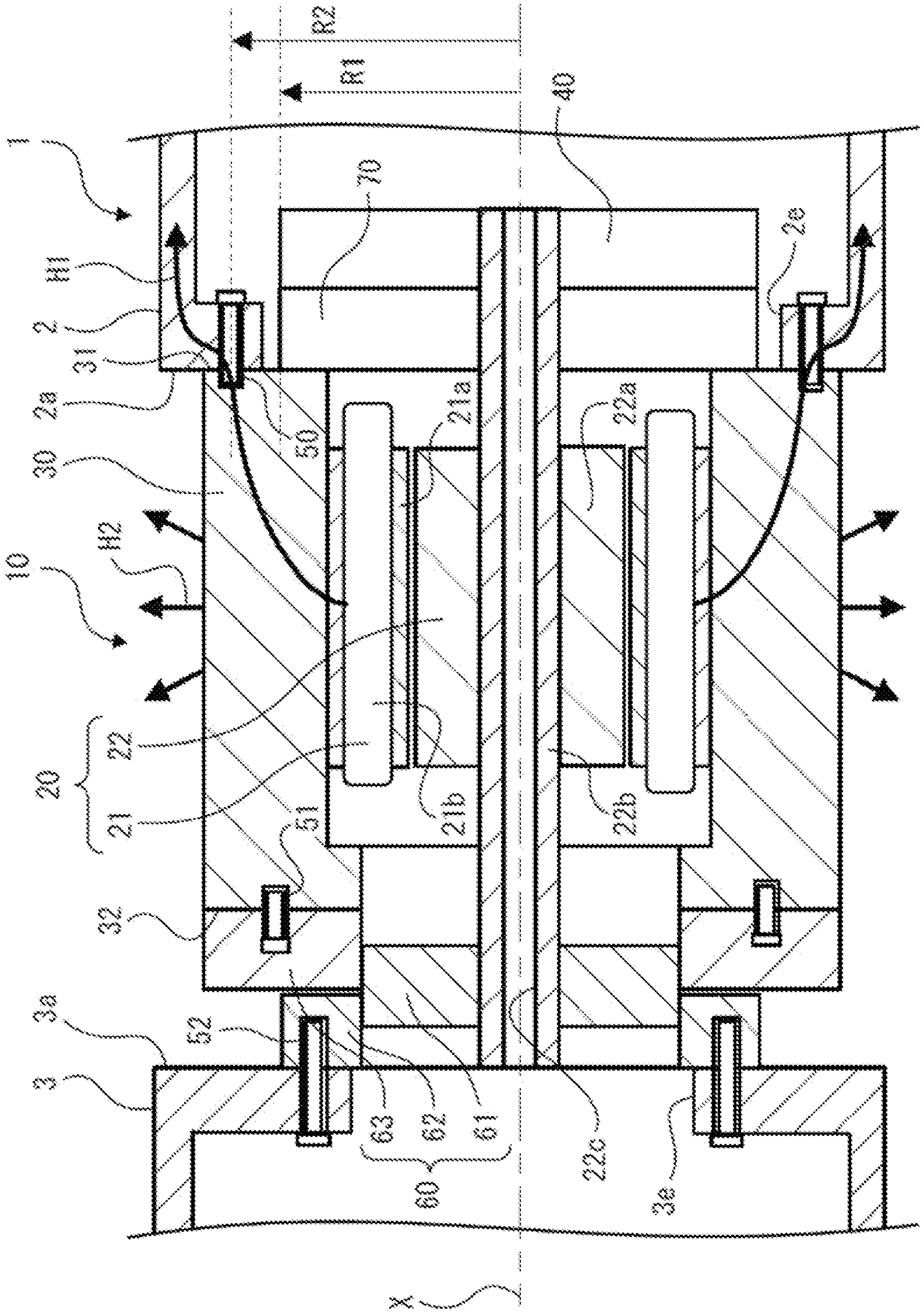
FIG. 1 is a longitudinal cross-sectional view of a machine of a first embodiment.

A configuration of a machine 1 of a first embodiment will be described below in detail. FIG. 1 is a longitudinal cross-sectional view of the machine 1 of the first embodiment. The machine 1 is formed by a robot, such as a single axis robot, a multi-axis robot, a parallel link-type robot, and a humanoid. Alternatively, in another embodiment, the machine 1 may be formed by a machine tool a construction machine, an agricultural machine, an industrial machine, such as a conveyor, or another machine, such as a vehicle and an aircraft. The machine 1 of the present embodiment is formed by an articulated robot and, although not illustrated, includes a plurality of actuators 10. Alternatively, in another embodiment, the machine 1 is sometimes formed by a single joint robot and includes only an actuator 10. The machine 1 includes a rear housing 2, an actuator 10 that is fixed to the rear housing 2, and a front housing 3 that operates by the actuator 10.

The housings 2 and 3 are formed by various types of links, such as, a trunk portion, an arm portion, a wrist portion, and the like of the articulated robot. Alternatively, in another embodiment, housings 2 and 3 may be formed by housings of another type of machine, such as an industrial machine, a vehicle body, and an aircraft body. The housings 2 and 3 are formed by hollow housings and include through-holes 2*e* and 3*e* through which wire bodies (not illustrated), such as a power line, a signal line, and a tube, penetrate.

The actuator 10 is formed by an electromagnetic actuator. The actuator 10 includes a motor 20, a container unit 30 that contains the motor 20, and a detection unit 40 that detects operation of the motor 20. Since the size in the radial direction of the motor 20 is designed to be comparatively smaller than the size in the radial direction of the rear housing 2, the actuator 10 includes fixing units 50 that fix a rear end surface 31 of the container unit 30 to an outer surface 2*a* of the rear housing 2 on the outer side in the radial direction of the detection unit 40.

In addition, the actuator 10, although not essential, further includes a reducer 60 that decelerates rotational speed of the motor 20, fixing units 51 that fix a support portion 63 of the reducer 60 to a front end surface 32 of the container unit 30, and fixing units 52 that fix an output portion 62 of the reducer 60 to the front housing 3. Further, the actuator 10, although not essential, may further includes a braking unit 70 that brakes operation of the motor 20.

The motor 20 is formed by an AC motor, such as an induction motor and a synchronous motor. Alternatively, in another embodiment, a motor 20 may be formed by a DC motor. The motor 20 includes a stator 21 and a rotor 22. The stator 21 is fixed to an inner surface of the container unit 30. The rotor 22 is supported in a rotatable manner about an axis X by the reducer 60 in front and a bearing in the rear (although not illustrated, disposed in, for example, the detection unit 40).

The stator 21 includes a stator core 21*a* that is formed by stacking electromagnetic steel sheets and a plurality of windings 21*b* that are wound around the stator core 21*a*. The rotor 22 includes a rotor core 22*a* that is formed by a basket-type conductor or the like and a rotor shaft 22*b* on which the rotor core 22*a* is attached. The rotor shaft 22*b*, although not essential, includes a through-hole 22*c* through which a wire body (not illustrated) penetrates.

The container unit 30 includes a case that contains the stator 21. Alternatively, in another embodiment, the container unit 30 may include a front case and a rear case that are fixed to a front end surface and a rear end surface of a stator core 21*a*, respectively. The container unit 30 is formed of a metal, such as aluminum, copper, and an alloy thereof, that has a comparatively high thermal conductivity (for example, 100 to 400 W/mK). Since the size in the radial direction of the motor 20 is designed to be smaller than the size in the radial direction of the rear housing 2, the container unit 30 is formed in such a manner that size in the radial direction of the container unit 30 is thicker than that of a general container unit.

The detection unit 40, although not illustrated, includes an encoder that detects a rotational position, rotational speed, and the like of the rotor 22 and a case that contains the encoder. The encoder is formed by an optical encoder. Alternatively, in another embodiment, an encoder may be formed by a magnetic encoder or an electromagnetic induction type encoder. The detection unit 40 is fixed to the rear end surface 31 of the container unit 30 with the braking unit 70 interposed therebetween. In addition, the detection unit 40 is arranged in the through-hole 2*e* of the rear housing 2. The size in the radial direction of the detection unit 40 is designed to be smaller than the size in the radial direction of the container unit 30.

Each of the fixing units 50 includes a fastening structure including a female screw and a male screw. The fixing units 50 are arranged in a plural number at intervals in the circumferential direction of the rear end surface 31 of the container unit 30. The fixing units 50 include female screws formed on the rear end surface 31 of the container unit 30. Alternatively, in another embodiment, the fixing units 50 may include male screws formed on a rear end surface 31 of a container unit 30. Screw through-holes being formed in the rear housing 2, inserting the male screws through the screw through-holes, and screwing the male screws into the female screws cause the fixing units 50 to fasten the rear end surface 31 of the container unit 30 to the outer surface 2*a* of the mar housing 2 on the outer side in the radial direction with respect to the detection unit 40 (a radial direction position R2 of each fixing unit 50>a radial direction position R1 of the detection unit 40). This configuration causes the actuator 10 to be fixed to the outer surface 2*a* of the rear housing 2.

The reducer 60 is formed by a wave gear reducer. Alternatively, in another embodiment, a reducer 60 may be formed by another type of reducer, such as a planetary gear reducer. The reducer 60 includes an input portion 61 that inputs torque from the rotor shaft 22*b* of the motor 20, the output portion 62 that converts input torque to torque matching a reduction ratio and outputs the converted torque, and the support portion 63 that supports the input portion 61 and the output portion 62 in a rotatable manner. The support portion 63 is fixed to the front end surface 32 of the container unit 30, and the output portion 62 is fixed to the housing 3.

When the reducer 60 is formed by a wave gear reducer, the input portion 61 is formed by a wave generator, the output portion 62 is formed by one of a flex spline and a circular spline, and the support portion 63 is formed by the other of the flex spline and the circular spline. Alternatively, in another embodiment, when a reducer 60 is formed by a planetary gear reducer, an input portion 61 is formed by a sun gear, an output portion 62 is formed by one of a planet gear and an inner gear ring, and a support portion 63 is formed by the other of the planet gear and the inner gear ring.

Each of the fixing units 51 includes a fastening structure including a female screw and a male screw. The fixing units 51 are arranged in a plural number at intervals in the circumferential direction of the front end surface 32 of the container unit 30. The fixing units 51 include female screws formed on the front end surface 32 of the container unit 30. Alternatively, in another embodiment, the fixing units 51 may include male screws formed on a front end surface 32 of a container unit 30. Screw through-holes being formed in the support portion 63 of the reducer 60, inserting the male screws through the screw through-holes, and screwing the male screws into the female screws cause the fixing units 51 to fasten the support portion 63 of the reducer 60 to the front end surface 32 of the container unit 30.

Each of the fixing units 52 includes a fastening structure formed by a female screw and a male screw. The fixing units 52 are arranged in a plural number at intervals in the circumferential direction of the output portion 62. The fixing units 52 include female screws formed in the output portion 62. Alternatively, in another embodiment, the fixing units 52 may include male screws formed in an output portion 62. Screw through-holes being formed in the front housing 3, inserting the male screws through the screw through-holes, and screwing the male screws into the female screws cause the fixing units 52 to fasten the output portion 62 of the reducer 60 to the front housing 3. This configuration causes the actuator 10 to be fixed to the outer surface 3_a_ of the front housing 3.

The braking unit 70, although not illustrated, includes a brake that brakes the rotor shaft 22_b_ and a case that contains the brake. The brake is formed by an electromagnetic brake. Alternatively, in another embodiment, a brake may be formed by a brake of another system including a hydraulic brake, a pneumatic brake, and the like. The braking unit 70 is directly fixed to the rear end surface 31 of the container unit 30. In addition, the braking unit 70 is arranged in the through-hole 2_e_ of the rear housing 2. The size in the radial direction of the braking unit 70 is designed to be smaller than the size in the radial direction of the container unit 30.

Operation of the machine 1 of the first embodiment will be described below in detail. When the motor 20 is, for example, an induction motor, currents are sequentially supplied to the plurality of windings 21_b_ with phases shifted from each other. A rotating magnetic field is generated in the stator core 21_a_, induced current is generated in the rotor core 22_a_, torque is generated in the rotor core 22_a_ by interaction between the current and the magnetic field, and the rotor shaft 22_b_ rotates. The torque in the rotor shaft 22_b_ is input to the input portion 61 of the reducer 60, the input torque is converted to torque matching a reduction ratio, and the converted torque is output from the output portion 62. Because of this configuration, the actuator 10 causes the front housing 3 to relatively rotate with respect to the rear housing 2.

Although the size in the radial direction of the motor 20 is designed to be smaller than the size in the radial direction of the rear housing 2, since the fixing units 50 fix the rear end surface 31 of the container unit 30 to the rear housing 2 on the outer side in the radial direction of the detection unit 40 (R2>R1), generated heat in the windings 21_b_ (copper loss) and generated heat in the stator core 21_a_ (iron loss) are, as illustrated by heat conduction paths H1, conducted to the container unit 30 and subsequently directly conducted from the rear end surface 31 of the container unit 30 to the rear housing 2 and dissipated. In other words, since the front side of the actuator 10 is fixed to the front housing 3 via a gear and the like of the reducer 60, generated heat in the motor 20 is conducted to the rear housing 2 and dissipated.

In addition, since the actuator 10 is fixed to the outer surface 2_a_ of the rear housing 2 and at the same time fixed to the outer surface 3_a_ of the front housing 3, the container unit 30 is exposed to the outside air. Because of this configuration, generated heat in the windings 21_b_ (copper loss) and generated heat in the stator core 21_a_ (iron loss) are, as illustrated by heat conduction paths H2, conducted to the container unit 30 and subsequently directly emitted and dissipated to the outside air. In other words, generated heat in the motor 20 is emitted and dissipated to the outside air. As described above, direct heat conduction to the housing 2 and direct heat emission to the outside air enables heat dissipation of the actuator 10 to be increased and continuous rated torque of the motor 20 to be eventually improved.

Figure 2:
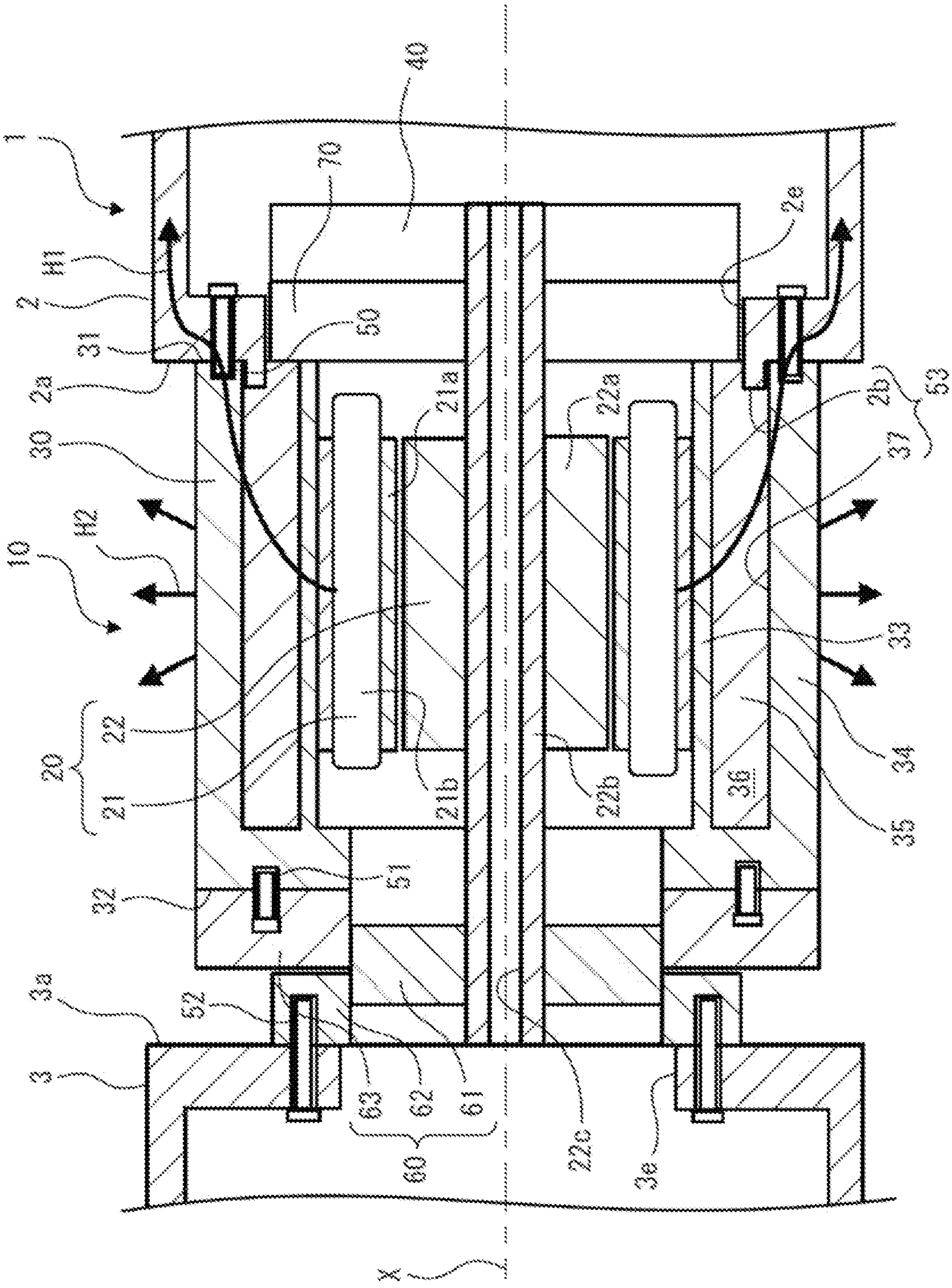
FIG. 2 is a longitudinal cross-sectional view of a machine of a second embodiment.
Figure 3:
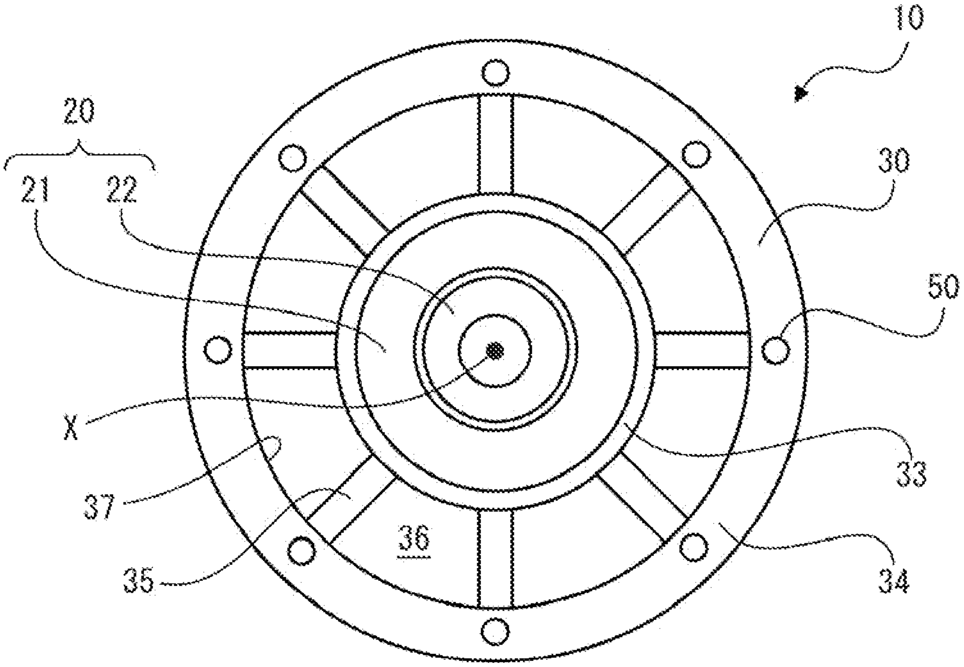
FIG. 3 is a rear view of an actuator.

A machine 1 of a second embodiment will be described below in detail. Note that in the following description, only a portion different from the machine 1 of the first embodiment will be described and a description of the same or similar portion will be omitted. FIG. 2 is a longitudinal cross-sectional view of the machine 1 of the second embodiment, and FIG. 3 is a rear view of an actuator 10. The machine 1 of the second embodiment differs from the machine 1 of the first embodiment in that a container unit 30 includes an inner side cylindrical body 33 that contains a motor 20, an outer side cylindrical body 34 that surrounds the inner side cylindrical body 33 with cavities 36 interposed therebetween, and a plurality of ribs 35 that connect the inner side cylindrical body 33 and the outer side cylindrical body 34.

The ribs 35 are arranged in a plural number at intervals in the circumferential direction of the container unit 30. Each of the cavities 36 is formed between a rib 35 and another rib 35. Since each rib 35 extends straight in a radial direction from the inner side cylindrical body 33 to the outer side cylindrical body 34, the container unit 30 has a simple structure and is easily manufactured. The container unit 30 having such a shape is formed by casting, such as aluminum die casting. Even when the size in the radial direction of the motor 20 is designed to be smaller than the size in the radial direction of a housing 3 and the size in the radial direction of the container unit 30 is formed thicker than that of a general container unit, it is possible to reduce weight of the actuator 10 by the cavities 36 formed in the container unit 30.

In addition, generated heat in windings 21_b_ (copper loss) and generated heat in a stator core 21_a_ (iron loss) are, as illustrated by heat conduction paths 111, conducted to the plurality of ribs 35 formed in the container unit 30 and subsequently directly conducted from a rear end surface 31 of the container unit 30 to a rear housing 2 and dissipated. In other words, since length of the heat conduction paths H1 in the second embodiment is substantially the same as length of the heat conduction paths H1 in the first embodiment, the machine 1 of the second embodiment is capable of, while reducing the weight of the actuator 10, achieving substantially the same heat dissipation effect as that of the machine 1 of the first embodiment.

The machine 1 of the second embodiment also differs from the machine 1 of the first embodiment in terms of including additional fixing units 53 that fix the rear end surface 31 of the container unit 30 to an outer surface 2*a* of the rear housing 2. Each of the fixing units 53 includes a fitting structure including a protruding portion and a recessed portion. In other words, each of the fixing units 53 includes a protruding portion 2*b* formed on the rear housing 2 and a recessed portion 37 formed on the rear end surface 31 of the container unit 30. Alternatively, in another embodiment, the fixing units 53 may include protruding portions formed on a rear end surface 31 of a container unit 30 and recessed portions formed on a rear housing 2.

The pairs of a recessed portion 37 and a protruding portion 2*b* are arranged in a plural number at intervals in the circumferential direction of the rear end surface 31 of the container unit 30. Alternatively, in another embodiment, pairs of a recessed portion 37 and a protruding portion 2*b* may be formed by a fitting structure composed of two cylindrical bodies (a spigot structure). Fitting the protruding portions 2*b* into the recessed portions 37 causes the fixing units 53 to fix the rear end surface 31 of the container unit 30 to the outer surface 2*a* of the rear housing 2. The fixing units 50 and 53 of the actuator 10 including both the fastening structure and the fitting structure as described above enables the actuator 10 to be easily positioned and also easily fastened to the rear housing 2.

Figure 4:
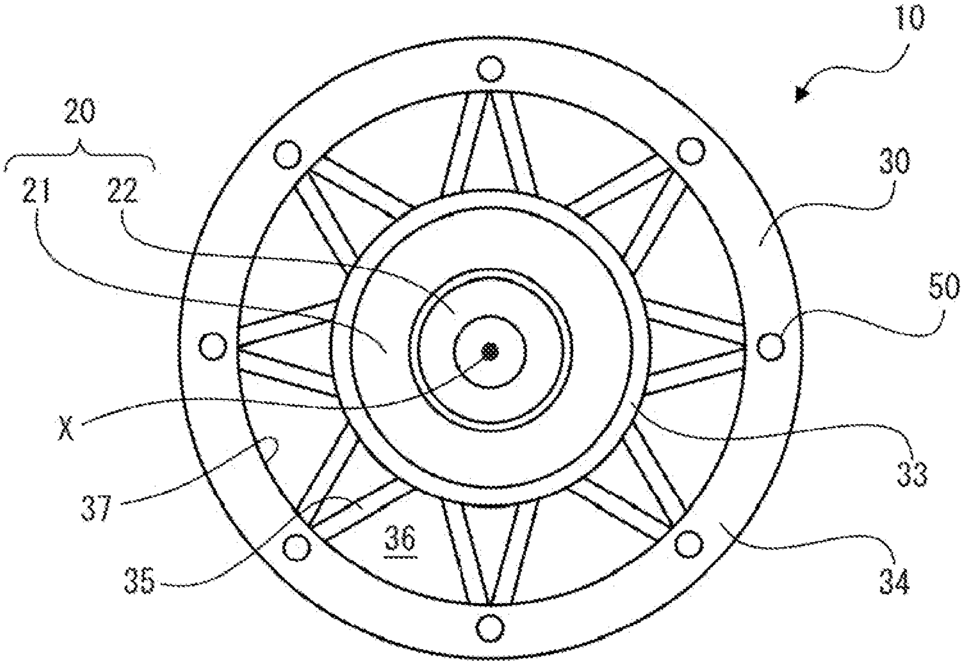
FIG. 4 is a rear view of a variation of the actuator.

FIG. 4 is a rear view of an actuator 10 of a variation. The actuator 10 of the variation differs from the aforementioned actuator 10 in that as viewed from the rear of the container unit 30, a plurality of ribs 35 form a truss structure in a circumferential direction about an axis X of the actuator 10. In other words, isosceles triangles each of which has two ribs 35 as the equal sides are formed, the inner side cylindrical body 33 forms the bases of the isosceles triangles, and the outer side cylindrical body 34 forms vertices of the isosceles triangles.

Alternatively, in another embodiment, an inner side cylindrical body 33 may form vertices of isosceles triangles, and an outer side cylindrical body 34 may form bases of the isosceles triangles. By the plurality of ribs 35 forming a truss structure in the circumferential direction about the axis X of the actuator 10 as described above, advantageous effects that the container unit 30 becomes less likely to deform when a rotor 22 rotates and transmits torque and the motor 20, while achieving weight reduction, and becomes less likely to be damaged, can be achieved.

Figure 5:
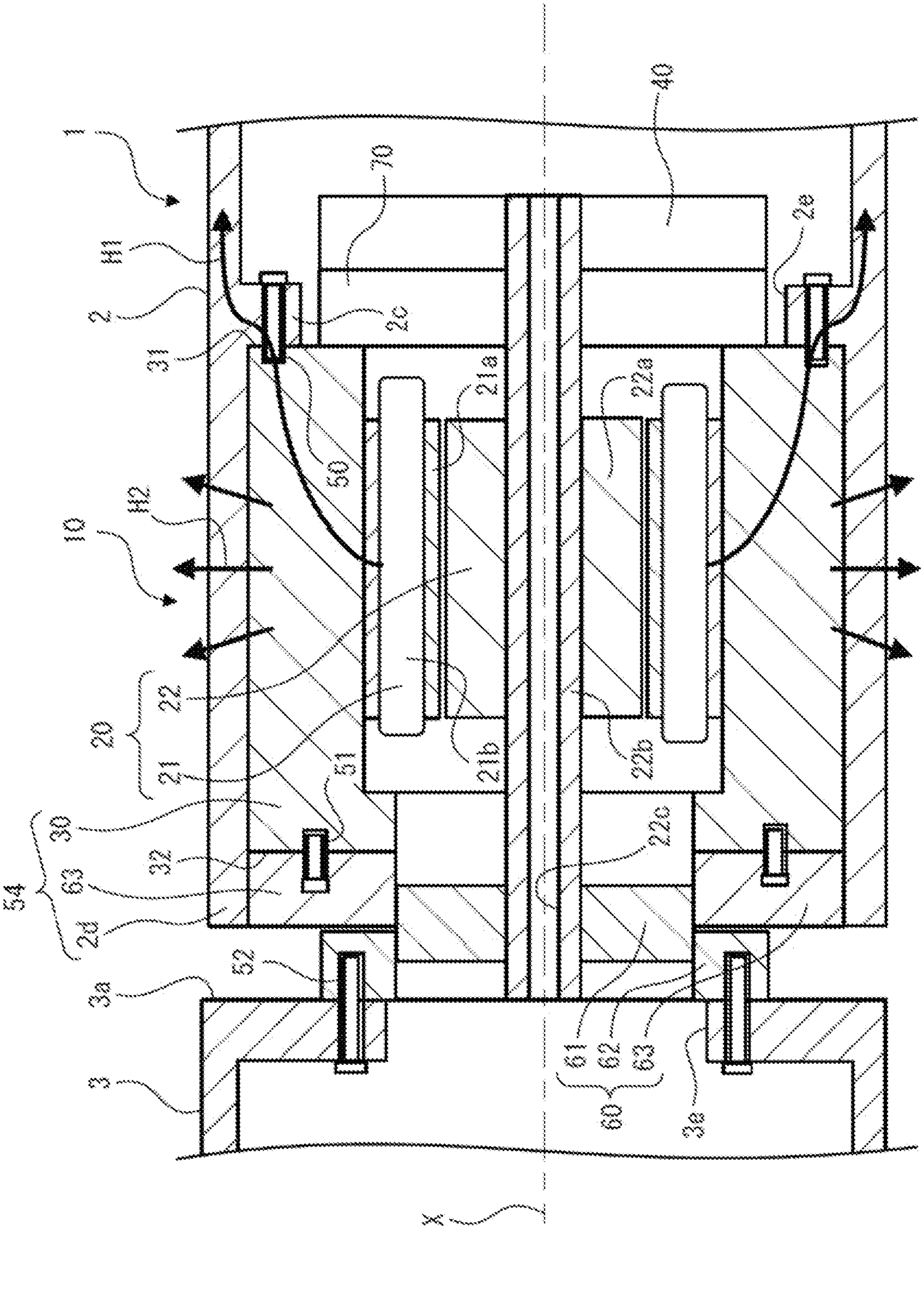
FIG. 5 is a longitudinal cross-sectional view of a machine of a third embodiment.

A machine 1 of a third embodiment will be described below in detail. Note that in the following description, only a portion different from the machine 1 of the first embodiment will be described and a description of the same or similar portion will be omitted. FIG. 5 is a longitudinal cross-sectional view of the machine 1 of the third embodiment. The machine 1 of the third embodiment differs from the machine 1 of the first embodiment in that a rear housing 2 includes a flange portion 2*c* that engages with a rear end surface 31 of a container unit 30 on an inner surface of the rear housing 2 and a cylindrical portion 2*d* that extends forward from the flange portion 2*c* and the container unit 30 is fitted into the cylindrical portion 2*d* of the rear housing 2. The flange portion 2*c* extends inward of the housing 2. The cylindrical portion 2*d* may also be fitted onto the support portion 63 of the reducer 60.

In other words, the machine 1 of the third embodiment differs from the machine 1 of the first embodiment in terms of including an additional fixing unit 54 that fixes the rear end surface 31 of the container unit 30 to the flange portion 2*c* of the rear housing 2. The fixing unit 54 includes a fitting structure including a protruding portion and a recessed portion. In other words, the fixing unit 54 includes a protruding portion, namely the container unit 30 (and the support portion 63), and a recessed portion, namely the cylindrical portion 2*d* of the rear housing 2.

The fixing unit 54 can also be said to be a fitting structure composed of two cylindrical bodies (a spigot structure). Fitting the container unit 30 into the cylindrical portion 2*d* of the rear housing 2 causes the fixing unit 54 to fix the rear end surface 31 of the container unit 30 to the flange portion 2*c* formed on the inner surface of the rear housing 2. Fixing units 50 and 54 of an actuator 10 including both a fastening structure and the fitting structure as described above enables the actuator 10 to be easily positioned and also easily fastened to the rear housing 2.

In addition, the container unit 30 (and the support portion 63) is preferably in metallic contact with the cylindrical portion 2*d* of the rear housing 2. For example, it is preferable that the container unit 30 (and the support portion 63) and the cylindrical portion 2*d* of the rear housing 2 be formed of a metal, such as aluminum, copper, and an alloy thereof, that has a comparatively high thermal conductivity (for example, 100 to 400 W/mK) and be in surface contact with each other. Because of this configuration, generated heat in windings 21*b* (copper loss) and generated heat in a stator core 21*a* (iron loss) are, as illustrated by heat conduction paths H1, conducted to the container unit 30 and subsequently directly conducted from the container unit 30 to the rear housing 2 and dissipated and are, as illustrated by heat conduction paths H2, also conducted from the container unit 30 to the rear housing 2 and subsequently directly emitted and dissipated to the outside air. As described above, direct heat conduction to the housing 2 and direct heat emission to the outside air enables heat dissipation of the actuator 10 to be increased and continuous rated torque of the motor 20 to be eventually improved.

In addition, in another embodiment, when the container unit 30 (and a support portion 63) and a cylindrical portion 2*d* of the rear housing 2 are not completely in surface contact with each other and have a gap therebetween, the gap between the container unit 30 (and the support portion 63) and the cylindrical portion 2*d* of the rear housing 2 may be filled with a thermal conductive material (not illustrated). Examples of the thermal conductive material include thermal conductive resin that is formed by causing thermal conductive fibers to interlink with one another in a matrix resin.

Examples of the matrix resin include thermo-sets, such as polyimide resin, silicon resin, epoxy resin, and phenol resin, and a heat resistant resin including a thermoplastic resin, such as polyphenylene sulfide resin, polycarbonate resin, polybutylene terephthalate resin, and polyacetal resin, and the like. The thermal conductive fiber includes aluminum nitride, magnesium oxide, boron nitride, alumina, anhydrous magnesium carbonate, silicon oxide, zinc oxide, and the like.

Applying thermal conductive resin produced as described above on an outer surface of the container unit 30 (and the support portion 63) and subsequently fitting the container unit 30 (and the support portion 63) into the cylindrical portion 2*d* of the rear housing 2 cause the gap between the container unit 30 (and the support portion 63) and the cylindrical portion 2*d* of the rear housing 2 to be filled with the thermal conductive resin. Alternatively, in another embodiment, by injecting thermal conductive resin into a gap between a container unit 30 (and a support portion 63) and a cylindrical portion 2*d* of a rear housing 2, the gap between the container unit 30 (and the support portion 63) and the cylindrical portion 2*d* of the rear housing 2 may be filled with the thermal conductive resin. This configuration causes generated heat in a motor 20 to be easier to be conducted from the container unit 30 (and the support portion 63) to the cylindrical portion 2*d* of the rear housing 2 via the thermal conductive resin.

Figure 6:
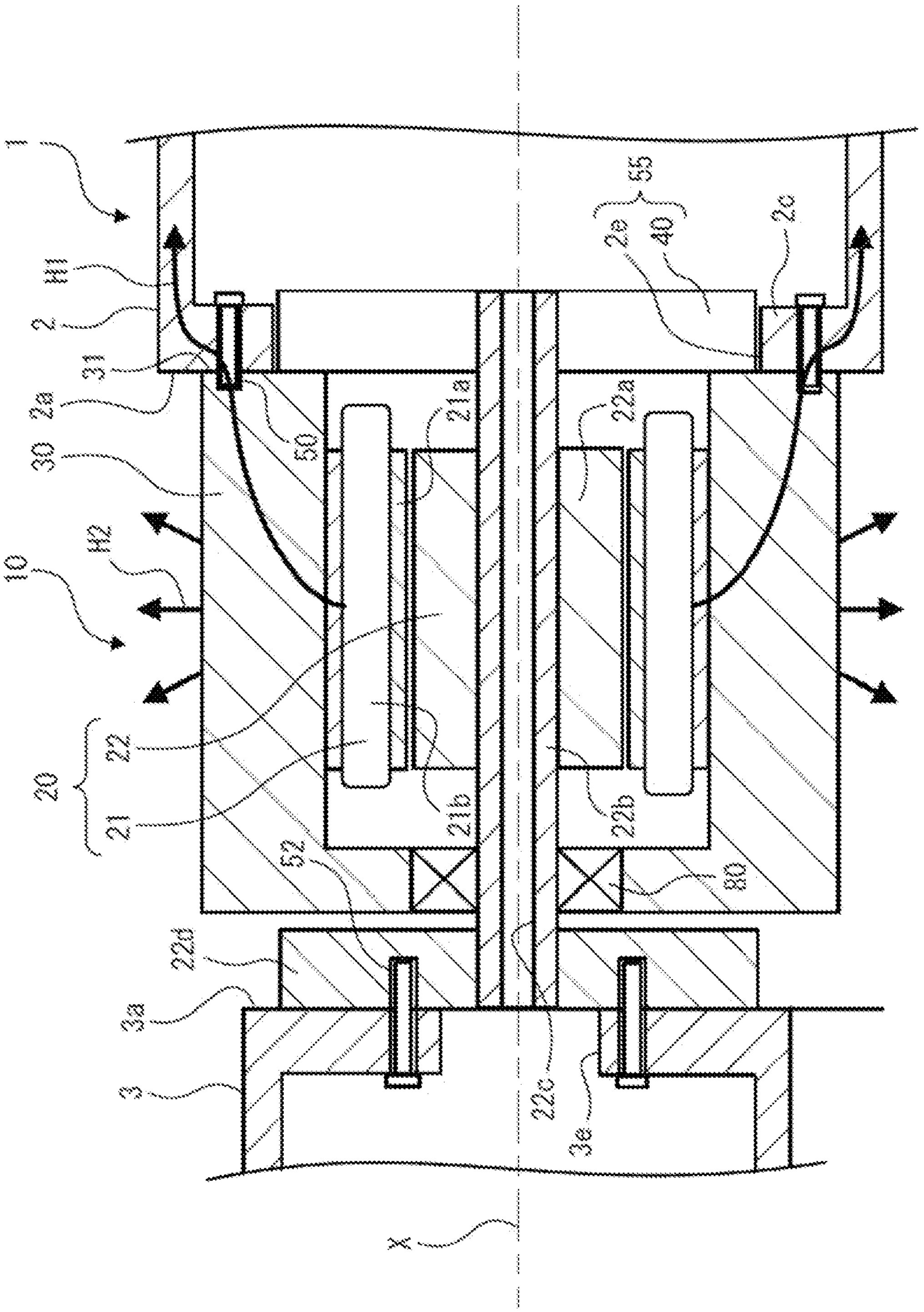
FIG. 6 is a longitudinal cross-sectional view of a machine of a fourth embodiment.

A machine 1 of a fourth embodiment will be described below. Note that in the following description, only a portion different from the machine 1 of the first embodiment will be described and a description of the same or similar portion will be omitted. FIG. 6 is a longitudinal cross-sectional view of the machine 1 of the fourth embodiment. The machine 1 of the fourth embodiment differs from the machine 1 of the first embodiment in that an actuator 10 does not include a reducer 60 and a braking unit 70. In other words, the actuator 10 is formed by a direct drive motor.

A rotor 22 of a motor 20 is supported in a rotatable manner about an axis X by a front bearing 80 (fixed to, for example, a container unit 30) and a rear bearing (although not illustrated, disposed in, for example, a detection unit 40). In addition, the rotor 22 further includes, in addition to a rotor core 22*a* and a rotor shaft 22*b*, a rotor flange 22*d*. The rotor flange 22*d* is fixed to the rotor shaft 22*b* and extends outward in the radial direction from the rotor shaft 22*b*.

Each of fixing units 52 includes a fastening structure formed by a female screw and a male screw. The fixing units 52 are arranged in a plural number at intervals in the circumferential direction of the rotor flange 22*d*. The fixing units 52 include female screws formed in the rotor flange 22*d*. Alternatively, in another embodiment, the fixing units 52 may include male screws formed on a rotor flange 22*d*. Screw through-holes being formed in a front housing 3, inserting the male screws through the screw through-holes, and screwing the male screws into the female screws cause the fixing units 52 to fasten the rotor flange 22*d* to the front housing 3. This configuration causes the actuator 10 to be fixed to an outer surface 3*a* of the front housing 3.

The detection unit 40 is directly fixed to a rear end surface 31 of the container unit 30. In addition, the detection unit 40 is arranged in a through-hole 2*e* of a rear housing 2. The size in the radial direction of the detection unit 40 is designed to be smaller than the size in the radial direction of the container unit 30. Fixing units 50 fasten the rear end surface 31 of the container unit 30 to an outer surface 2*a* of the rear housing 2 on the outer side in the radial direction of the detection unit 40. This configuration causes the actuator 10 to be fixed to the outer surface 2*a* of the rear housing 2.

The machine 1 of the fourth embodiment also differs from the machine 1 of the first embodiment in terms of including an additional fixing unit 55 that fixes the rear end surface 31 of the container unit 30 to the outer surface 2*a* of the rear housing 2. The fixing unit 55 includes a fitting structure including a protruding portion and a recessed portion. In other words, the fixing unit 55 includes a protruding portion, namely the detection unit 40, and a recessed portion, namely the through-hole 2*e* of the rear housing 2.

The fixing unit 55 can also be said to be a fitting structure composed of two cylindrical bodies (a spigot structure). Fitting the detection unit 40 into the through-hole 2*e* of the rear housing 2 causes the fixing unit 55 to fix the rear end surface 31 of the container unit 30 to a flange portion 2*c* formed on the rear housing 2. The fixing units 50 and 55 of the actuator 10 including both the fastening structure and the fitting structure as described above enable the actuator 10 to be easily positioned and also easily fastened to the rear housing 2.

Figure 7:
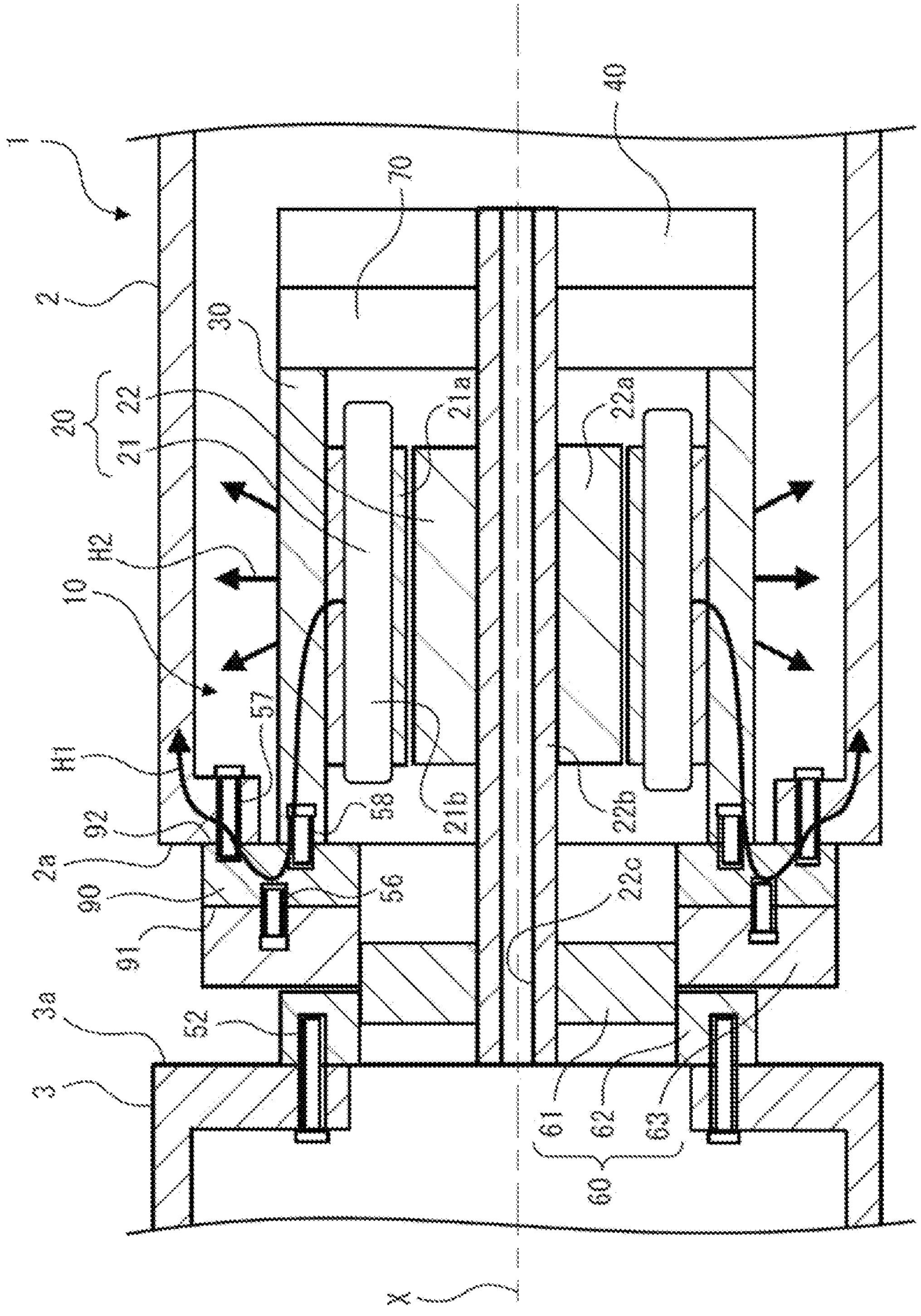
FIG. 7 is a longitudinal cross-sectional view of a machine of a comparative example.

A machine 1 of a comparative example will be described below. Note that in the following description, only constituent components different from the machine 1 of the first embodiment will be described and a description of the same or similar constituent components will be omitted. FIG. 7 is a longitudinal cross-sectional view of the machine 1 of the comparative example. The machine 1 of the comparative example differs from the machine 1 of the first embodiment in fixing an annular flange 90 to a front end surface of a container unit 30 with fixing units 58 and fixing a rear end surface 92 of the annular flange 90 to an outer surface 2*a* of a rear housing 2 with fixing units 57. In other words, in the machine 1 of the comparative example, a motor 20 is arranged in the rear housing 2. In addition, in the machine 1 of the comparative example, a front end surface 91 of the annular flange 90 is fixed to a support portion 63 of a reducer 60 with fixing units 56.

Generated heat in windings 21*b* (copper loss) and generated heat in stator core 21*a* (iron loss) are, as illustrated by heat conduction paths H1, conducted to the container unit 30 and subsequently conducted from a front end surface of the container unit 30 to the rear housing 2 via the annular flange 90 and dissipated. In other words, since the length of the heat conduction paths H1 in the comparative example is longer than the length of the heat conduction paths H1 in the first to fourth embodiments, the actuator 10 of the comparative example has a less heat dissipation effect than the actuators 10 of the aforementioned embodiments.

In addition, since the motor 20 is arranged inside the rear housing 2, the container unit 30 is not exposed to the outside air. Because of this configuration, generated heat in the windings 21*b* (copper loss) and generated heat in the stator core 21*a* (iron loss) are, as illustrated by heat conduction paths H2, only conducted to the container unit 30 and subsequently emitted and dissipated to inner atmosphere in the rear housing 2, as a result of which heat dissipation of the actuator 10 cannot be increased.

However, according to the machine 1 of each of the first to fourth embodiments, even when the size in the radial direction of the motor 20 is designed to be smaller than the size in the radial direction of the housing 2 of the machine 1, since the fixing units 50 fix the end surface 31 of the container unit 30 on the opposite side to the output side of the motor 20 to the housing 2 of the machine 1 on the outer side in the radial direction of the detection unit 40 (R2>R1), generated heat in the motor 20 can be directly dissipated from the container unit 30 to the housing 2 of the machine 1. In addition, when the container unit 30 is exposed to the outside air, generated heat in the motor 20 can be directly emitted from the container unit 30 to the outside air. Direct heat conduction to the housing 2 and direct heat emission to the outside air enables heat dissipation of the actuator 10 to be increased and continuous rated torque of the motor 20 to be eventually improved.

Although various embodiments have been described herein, it is to be noted that the present invention is not limited to the embodiments described above and various modifications can be made within the scope of the present invention described in the following claims.

REFERENCE SIGNS LIST

1 Machine
2 Rear housing

2*a* Outer surface
2*b* Protruding portion
2*c* Flange portion
2*d* Cylindrical portion
2*e* Through-hole
3 Front housing
3*a* Outer surface
3*e* Through-hole
10 Actuator
20 Motor
21 Stator
21*a* Stator core
21*b* Winding
22 Rotor
22*a* Rotor core
22*b* Rotor shaft
22*c* Through-hole
22*d* Rotor flange
30 Container unit
31 Rear end surface
32 Front end surface
33 Inner side cylindrical body
34 Outer side cylindrical body
35 Rib
36 Cavity
37 Recessed portion
40 Detection unit
50 to 58 Fixing unit
60 Reducer
61 Input portion
62 Output portion
63 Support portion
70 Braking unit
80 Bearing
90 Annular Range
91 Front end surface
92 Rear end surface
H1, 12 Heat conduction path
R1 Radial direction position of the detection unit
R2 Radial direction position of a fixing unit
X axis

The invention claimed is:

1. An actuator comprising:

a motor;

a container that contains the motor;

a detection unit configured to detect operation of the motor; and a fixing unit that fixes, on an outer side in a radial direction of the detection unit, an end surface of the container on an opposite side to an output side of the motor to a housing of a machine, wherein the detection unit is fixed, directly or via a braking unit, to the end surface of the container.

2. The actuator according to claim 1, wherein the container includes an inner side cylindrical body that contains the motor, an outer side cylindrical body that surrounds the inner side cylindrical body with a cavity interposed between the inner side cylindrical body and the outer side cylindrical body, and a plurality of ribs that connect the inner side cylindrical body and the outer side cylindrical body.

3. The actuator according to claim 2, wherein the plurality of ribs form a truss structure in a circumferential direction about an axis of the actuator.

4. The actuator according to claim 1, wherein the container is fitted into a cylindrical portion of the housing.

5. The actuator according to claim 1, wherein the container is in metallic contact with a cylindrical portion of the housing.

6. The actuator according to claim 1, further comprising a thermal conductive material with which a gap between the container and a cylindrical portion of the housing is filled.

7. The actuator according to claim 1, wherein the fixing unit includes both a fastening structure and a fitting structure.

8. The actuator according to claim 1, wherein the container is exposed to outside air.

9. The actuator according to claim 1, further comprising a fixing unit that fixes a reducer to an end surface of the container on an output side of the motor.

10. A machine comprising the actuator according to claim 1.

11. The machine according to claim 10, wherein the actuator is fixed to an outer surface of the housing.

12. The machine according to claim 10, wherein the actuator is fitted into a cylindrical portion of the housing.

13. The machine according to claim 10, wherein the machine includes a robot.

* * * * *